United States Patent [19]

Alattar

[11] Patent Number: 5,283,645
[45] Date of Patent: Feb. 1, 1994

[54] METHOD AND APPARATUS FOR DETECTING DISSOLVE REGIONS IN DIGITAL VIDEO SEQUENCES

[75] Inventor: Adnan M. Alattar, Plainsboro, N.J.

[73] Assignee: Intel Corporation, Hillsboro, Oreg.

[21] Appl. No.: 836,992

[22] Filed: Feb. 14, 1992

[51] Int. Cl.$^5$ ............................................. H04N 7/12
[52] U.S. Cl. ................................... 348/384; 348/592; 348/597
[58] Field of Search ............... 358/182, 183, 105, 139, 358/133, 136; 382/56

[56] References Cited

U.S. PATENT DOCUMENTS

| | | | |
|---|---|---|---|
| 4,198,653 | 4/1980 | Kamin | 358/105 |
| 4,205,345 | 5/1980 | Ross | 358/182 X |
| 4,764,809 | 8/1988 | Haycock et al. | 358/182 X |
| 5,115,311 | 5/1992 | Jaqua | 358/140 |
| 5,151,945 | 9/1992 | Lee et al. | 358/105 X |
| 5,168,363 | 12/1992 | Kojima et al. | 358/182 X |

FOREIGN PATENT DOCUMENTS 0128779  7/1985  Japan .................... 358/182

*Primary Examiner*—Victor R. Kostak
*Attorney, Agent, or Firm*—Carl L. Silverman; William H. Murray; Daniel H. Golub

[57] ABSTRACT

A method and apparatus for compressing a dissolve region within a sequence of digital motion video frames. A function is calculated based on statistical data derived from frames in the sequence. Dissolve region boundaries are then detected based on characteristics of the calculated function. Consecutive detected boundaries may be flagged as a dissolve region based on the average value of the function between the consecutive detected boundaries and the distance between the consecutive detected boundaries.

35 Claims, 6 Drawing Sheets

VARIANCE CURVE OF THE *"COMP B"* SEQUENCE

BLOWUP OF THE VARIANCE CURVE OF
FRAMES 450-500 OF THE "COMP B" SEQUENCE

PREPROCESSED SECOND-ORDER DIFFERENCE OF THE
VARIANCE CURVE OF THE *"COMP B"* SEQUENCE

THE DETECTED DISSOLVE REGION IN THE "COMP B" SEQUENCE

METHOD AND APPARATUS FOR DETECTING DISSOLVE REGIONS IN DIGITAL VIDEO SEQUENCES

FIELD OF INVENTION

This invention relates to video signal processing generally and particularly to systems for providing a compressed digital video signal representative of a full color video signal.

BACKGROUND

It is common practice in video production to use a dissolve region to concatenate two scenes. In such a region, the second scene gradually appears while the first scene gradually fades out, and by the end of the dissolve region, the second scene completely replaces the first. Although dissolve regions can be up to several seconds long, dissolves of ½ to 1 second are more common in video production. The dissolve process is typically called cross-fade.

Attempting to compress a dissolve region via image compression using a typical motion compensation algorithm results in a high entropy prediction error image. Encoding such an error image requires more bits than usual, which may not be affordable for all frames of a dissolve region without increasing the average bit-rate. An image that is encoded with an insufficient number of bits may appear blocky when it is decoded. The visibility of the blockiness may vary depending on the length of the dissolve region. Such blockiness can be eliminated by first detecting dissolves, then encoding the frames in a dissolve region in a proper or different way.

It is an object of the present invention to provide a method and apparatus for detecting dissolve regions and boundaries within digital video sequences.

Further objects and advantages of the invention will become apparent from the description of the invention which follows.

SUMMARY OF THE INVENTION

The present invention is directed to a method and apparatus for detecting a dissolve region within a sequence of digital motion video frames. According to the present invention, a function is calculated based on statistical data derived from the frames in the sequence. In a preferred embodiment, the value of a function is calculated for each frame in the sequence based on the statistical variance of pixel values within each frame. The preferred function is the second order difference of a function having values corresponding to the statistical variance of pixel values within each frame. Dissolve region boundaries are then detected based on characteristics of the calculated function. In the preferred embodiment, dissolve region boundaries are detected where the function has an absolute value which exceeds a first predetermined threshold. In this embodiment, consecutive detected boundaries are selected and the average value of the function between consecutive detected boundaries is calculated. A dissolve region is detected if the average value exceeds a second predetermined threshold and the distance between the subject boundaries is less than a third predetermined threshold. The first predetermined threshold may be made to vary in accordance with the local characteristics of the function.

In an alternate embodiment of the present invention, the value of a function is calculated for each frame in the sequence representing the statistical variance of pixel values within each frame. Dissolve region boundaries are then detected by determining where the function is parabolic in shape. According to this embodiment, a dissolve region may be determined to exist between consecutive dissolve region boundaries when the distance between consecutive detected boundaries is less than a predetermined threshold.

In a still further embodiment, intermediate processing may be employed to enhance the function used for dissolve detection. In this embodiment, the function may be filtered to remove remnants of hard scene changes. If the function is the second order difference of a function having values corresponding to the statistical variance of pixel values within each frame, all but the first spike in any cluster of spikes may be filtered and removed. Any detected boundaries or regions may also be adjusted due to frame shifting which may occur during processing.

DETAILED DESCRIPTION OF THE PREFERRED EMBODIMENT

Figure 1A:
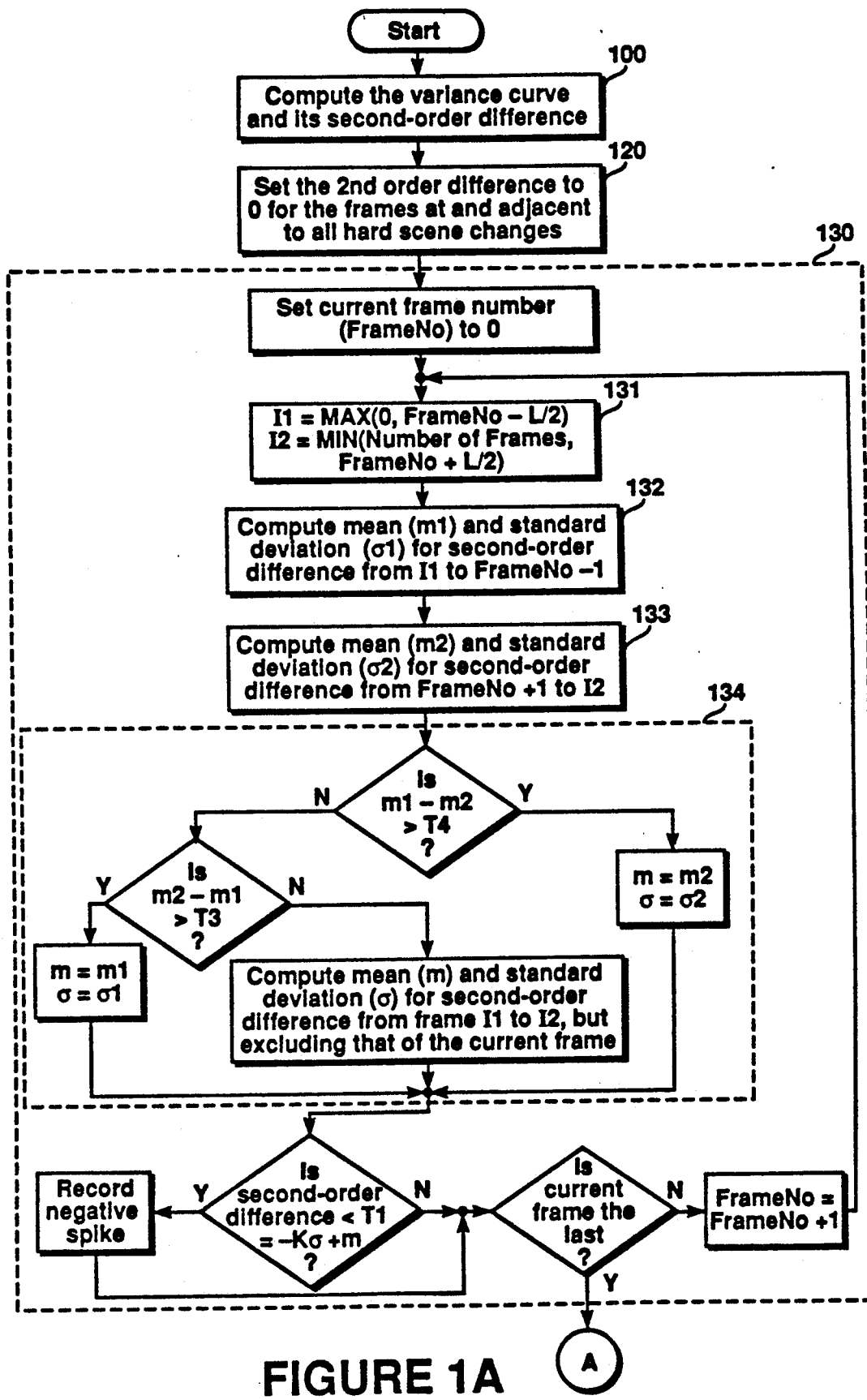
FIGS. 1A and 1B shows a flow diagram illustrating the operation of a preferred embodiment of the present invention.
Figure 1B:
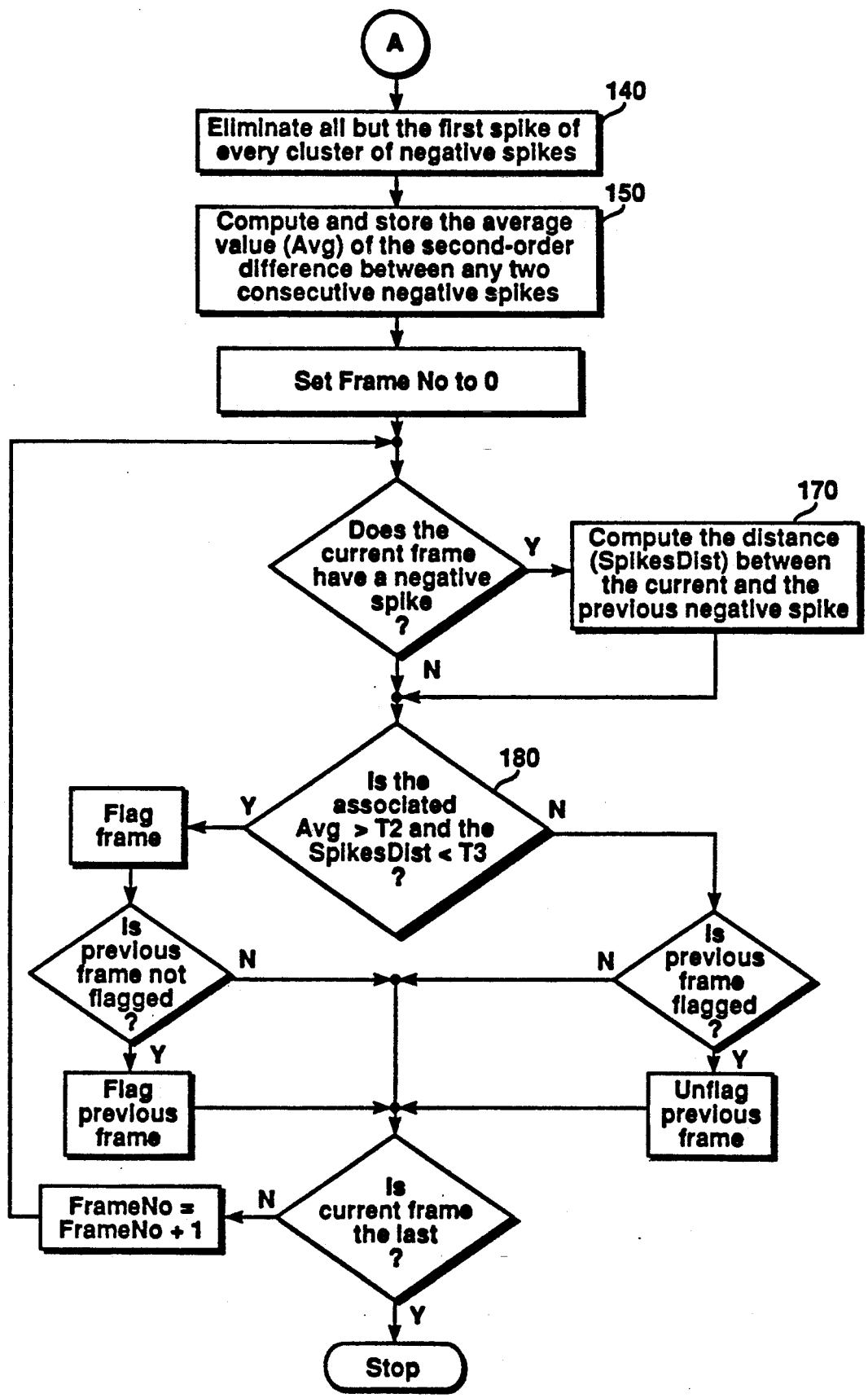

Referring now to FIG. 1, there is shown a flow diagram illustrating the operation of a dissolve detector according to the present invention for detecting a dissolve region or a dissolve region boundary within a sequence of digital motion video frames. The dissolve detector of FIG. 1 comprises calculating means 100 for calculating a function based on statistical data derived from said frames, and dissolve region boundary detection means 130 for detecting from said function whether a dissolve region boundary is present. In the embodiment of FIG. 1, dissolve region boundary detection means 130 determines a dissolve region boundary to exist when said function exceeds a first predetermined threshold (T1). Means 150 for calculating the average value of said function between consecutive detected boundaries, and means 170 for determining the distance between consecutive detected boundaries may also provided. In the embodiment shown, dissolve region flagging means 180 for determining when said average value exceeds a second predetermined threshold (T2) is also provided. Dissolve region flagging means 180 may also function to determine if the distance between consecutive detected boundaries is less than a third predetermined threshold (T3). The present invention has been implemented using an Intel model i860 parallel processor.

The mathematical basis underlying the operation of the preferred embodiment of the present invention may be understood by considering a video signal $f(x,y,t)$ that contains a dissolve region from scene $g(x,y,t)$ to another scene $h(x,y,t)$.

$$f(x,y,t) = \begin{cases} g(x,y,t) & t < t_1 \\ (1 - \alpha(t))g(x,y,t) + \alpha(t)h(x,y,t) & t_1 \leq t \leq t_2 \\ h(x,y,t) & t > t_2 \end{cases} \quad (1)$$

where x, y and t are continuous variables that represent the horizontal, vertical and temporal dimensions, respectively. The parameter $\alpha(t)$ is set equal to $$\frac{t - t_1}{t_2 - t_1},$$

and hence varies linearly with the location of the frame t within the dissolve region. If $g(x, y, t)$ and $h(x, y, t)$ are assumed to be statistically independent with variances $\sigma_g^2(t)$ and $\sigma_h^2(t)$, respectively, then, the variance $\sigma_f^2(t)$ of $f(x, y, t)$ is given by the following equation (2):

$$\sigma_f^2(t) = \begin{cases} \sigma_g^2(t) & t < t_1 \\ (1 - \alpha(t))^2 \sigma_g^2(t) + \alpha^2(t)\sigma_h^2(t) & t_1 \leq t \leq t_2 \\ \sigma_h^2(t) & t > t_2 \end{cases} \quad (2)$$

If each scene is assumed Ergodic, then the variance of the images in each scene is constant over the entire scene. Hence, Eq. (2) may be reduced to $$\sigma_f^2(t) = \begin{cases} \sigma_g^2 & t < t_1 \\ (\sigma_g^2 + \sigma_h^2)\alpha^2(t) - 2\sigma_g^2\alpha(t) + \sigma_g^2 & t_1 \leq t \leq t_2 \\ \sigma_h^2(t) & t > t_2 \end{cases} \quad (3)$$

From Eq. (3), it is clear that the variance $\sigma_f^2(t)$ for $t_1 \leq t \leq t_2$ is a parabola which is concave upward, and that this parabolic behavior is confined to dissolve regions. According to the present invention, a dissolve region can therefore be detected by detecting its associated parabola.

Taking the first and second derivatives of Eq. (3) with respect to t gives $$\frac{d(\sigma_f^2(t))}{dt} = \begin{cases} 0 & t < t_1 \\ \frac{2}{(t_2 - t_1)}[(\sigma_g^2 + \sigma_h^2)\alpha(t) - \sigma_g^2] & t_1 < t < t_2 \\ 0 & t > t_2 \end{cases} \quad (4)$$

$$\frac{d^2(\sigma_f^2(t))}{dt^2} = \begin{cases} 0 & t < t_1 \\ \frac{2}{(t_2 - t_1)}(\sigma_g^2 + \sigma_h^2) & t_1 < t < t_2 \\ 0 & t > t_2 \end{cases} \quad (5)$$

It can be seen that the first and second derivatives of the variance curve (Eq. (3)) are not defined at the discontinuity points $t = t_1$ and $t = t_2$.

During digital video compression, the video signal, $f(x, y, t)$, is digitized temporally as well as spatially to form a digital image sequence, $f(i, j, nT)$, which can be written as $$f(i,j,nT) = \begin{cases} g(i,j,nT) & n < N \\ (1 - \alpha(n))g(i,j,nT) + \alpha(n)h(i,j,nT) & N \leq n \leq M \\ h(i,j,nT) & n > M \end{cases} \quad (6)$$

where i, j, and n are the vertical, horizontal and temporal indices, respectively. T is the frame duration time, and is typically equal to 1/30 second. The parameter $\alpha(n)$ equals $$\frac{n - N}{M - N}$$

In the digital domain, the variance curve of Eq. (3) then becomes discrete, and can be written as:

$$\sigma_f^2(nT) = \begin{cases} \sigma_g^2 & n < N \\ (\sigma_g^2 + \sigma_h^2)\alpha^2(n) - 2\sigma_g^2\alpha(n) + \sigma_g^2 & N \leq n \leq M \\ \sigma_h^2 & n > M \end{cases} \quad (7)$$

The second derivative of the discrete variance curve (Eq. (7)) may be approximated by a second-order difference equation $\Psi_f(nT)$:

$$\Psi_f(nT) = \sigma_f^2(nT) - 2\sigma_f^2(T(n-1)) + \sigma_f^2(T(n-2)) \quad (8a)$$

$$\Psi_f(nT) = \begin{cases} 0 & n < N+1 \\ \frac{1}{(M-N)^2}(\sigma_g^2 + \sigma_h^2) - \frac{2}{(M-N)}\sigma_g^2 & n = N+1 \\ \frac{2}{(M-N)^2}(\sigma_g^2 + \sigma_h^2) & N \leq n \leq M \\ \frac{1}{(M-N)^2}(\sigma_g^2 + \sigma_h^2) - \frac{2}{(M-N)}\sigma_h^2 & n = M+1 \\ 0 & N > M+1 \end{cases}$$

Thus, the second-order difference of the parabola of Eq. (7) is a positive constant value with two negative large spikes, one at the beginning and the other at the end of the parabola, i.e., at $n = N+1$ and $n = M+1$. These two negative spikes are due to the discontinuities at $n = N$ and $n = M$, and may be used in detecting the parabola, and hence, the dissolve region.

Referring again to FIG. (1), there is shown a flow diagram illustrating operation of a preferred dissolve region detector according to the present invention. Calculating means 100, for calculating a function based on statistical data derived from a frame sequence, begins by calculating the second-order difference of the variance curve, $\Psi_f(nT)$ for the subject frame sequence. Dissolve region boundary detection means 130 for detecting from said calculated function whether a dissolve region boundary is present, then records negative spikes in $\Psi_f(nT)$ whose magnitudes exceed a first predetermined threshold T1. Cluster filtering means 140 for filtering said recorded spikes, then removes all but the first in every cluster of negative spikes. Means 150 for calculating the average value of the calculated function between consecutive detected boundaries, next calculates the average value of $\Psi_f(nT)$ within the regions defined by each pair of consecutive negative spikes. Means 170 for determining the distance between consecutive detected boundaries, next computes the width of the regions defined by each pair of consecutive negative spikes. Dissolve region flagging means 180 for determining whether said average value exceeds a second predetermined threshold, compares the calculated average value for a subject pair of consecutive detected spikes with a second predetermined threshold T2. In the preferred embodiment, dissolve region flagging means 180 also compares the calculated distance between a subject pair of consecutive detected spikes with a third predetermined threshold T3. In the embodiment shown, if the calculated average value exceeds T2, and if the calculated distance between the two subject spikes is less than T3, a dissolve region is flagged for all the frames between and including the two spikes. T3 is used to eliminate long dissolves which need not be flagged for special processing.

In the preferred embodiment of the present invention, the value of T1 is adapted to the local characteristics of $\Psi_f(nT)$. For frame n, $T1 = -k_d \sigma_d + m_d$, where $k_d$ is a positive constant. $\sigma_d$ and $m_d$ are the standard deviation and the mean, respectively, of $\Psi_f(nT)$ either in a window of length L, that is centered around, but excluding frame n, or in a window of length L/2 that is adjacent to frame n. The mean and standard deviation of the window centered around frame n are used if the difference between the means of the left and right adjacent windows is less than a fourth predetermined threshold, T4. However, if it is not, then the mean and the standard deviation of the adjacent window with the smallest mean are used. Blocks 131–134 illustrate this preferred method for calculating $\sigma_d$ and $m_d$ on a frame by frame basis. It is to be understood that in alternate embodiments, T1 need not be made to vary in accordance with the local characteristics of the function for determining whether dissolve region boundaries are present. In such alternate embodiments, T1 can simply be set at a predetermined constant for determining in all instances whether dissolve region boundaries are present.

To discriminate between dissolve regions which need not be identified for special handling, some pre-processing of $\Psi_f(nT)$ is also employed in the preferred embodiment of the present invention. Thus, hard scene filtering means 120 may be used to detect and eliminate all negative and positive spikes which are due to hard scene changes. In addition, cluster filtering means 140 may be used for setting the value of $\Psi_f(nT)$ at a frame immediately next to a frame that has a negative spike to zero.

Finally, post-processing of the flagged dissolve regions may also be used to process detected dissolve regions to further optimize encoding. In this regard, two adjacent dissolve regions that can form one continuous region may be identified and the region with the smaller average second derivative value between its spikes may be ignored. Two regions can not generally be merged together to form one dissolve, because a negative spike is not expected within a dissolve region, since the value of $\Psi_f(nT)$ for the intermediate frames is typically a positive constant. Also, an adjustment stage may be employed to compensate for a one-frame shift in detected dissolve regions due to approximating the second derivative with a second-order difference operation.

Figure 2:
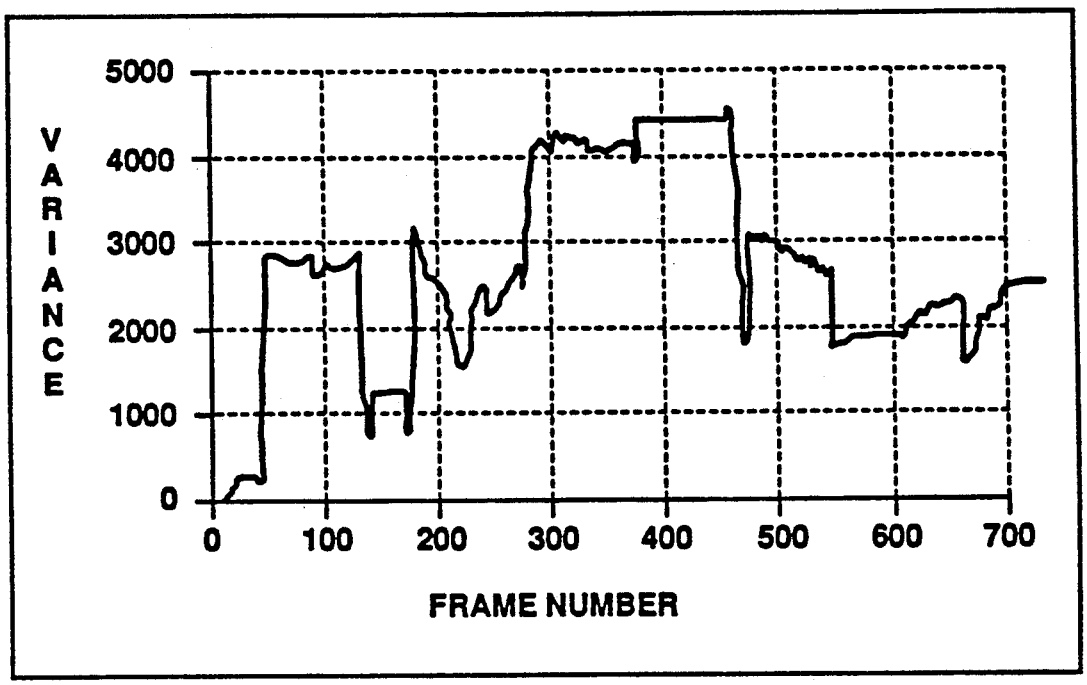
FIG. 2 is a diagram of the variance curve for an exemplary sequence of digital motion video frames.
Figure 3:
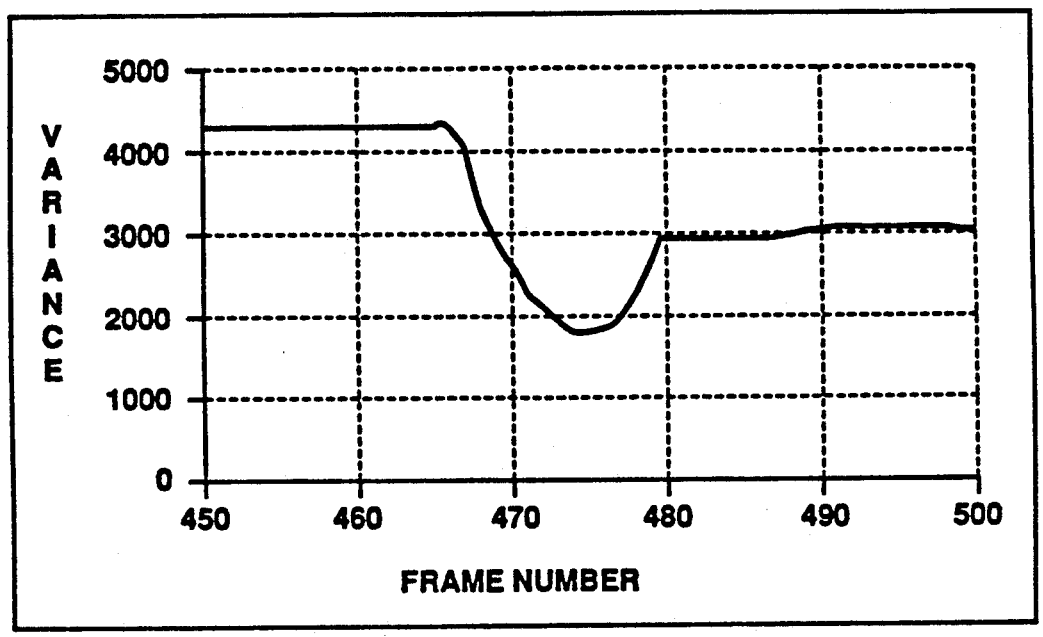
FIG. 3 is an expanded diagram showing a portion of the variance curve of FIG. 2.
Figure 4:
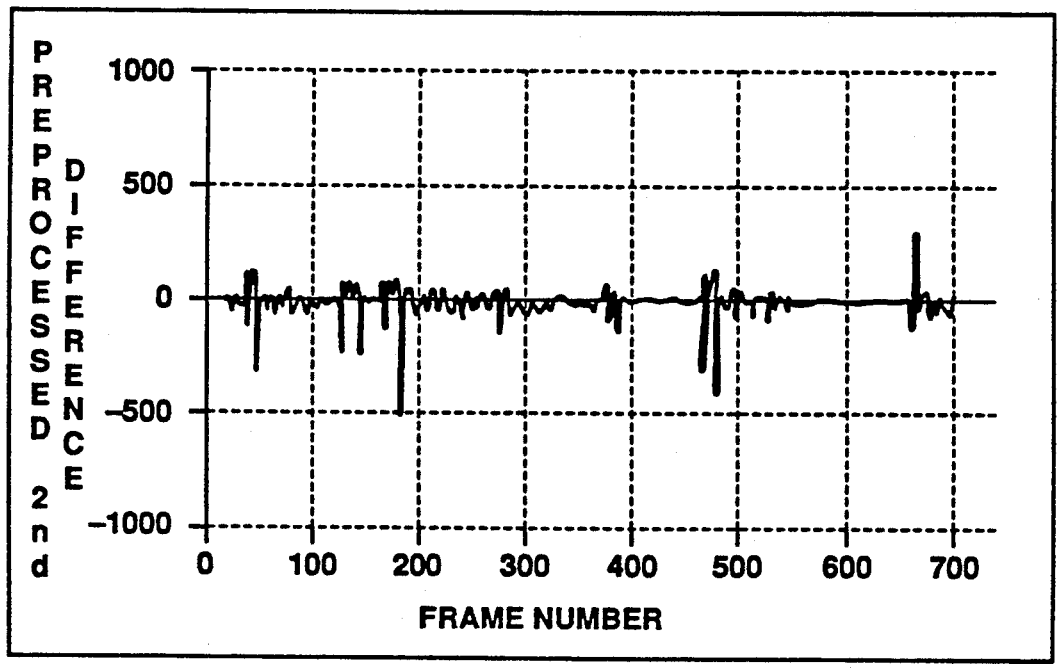
FIG. 4 is a preprocessed second-order difference representation of the variance curve of FIG. 2.
Figure 5:
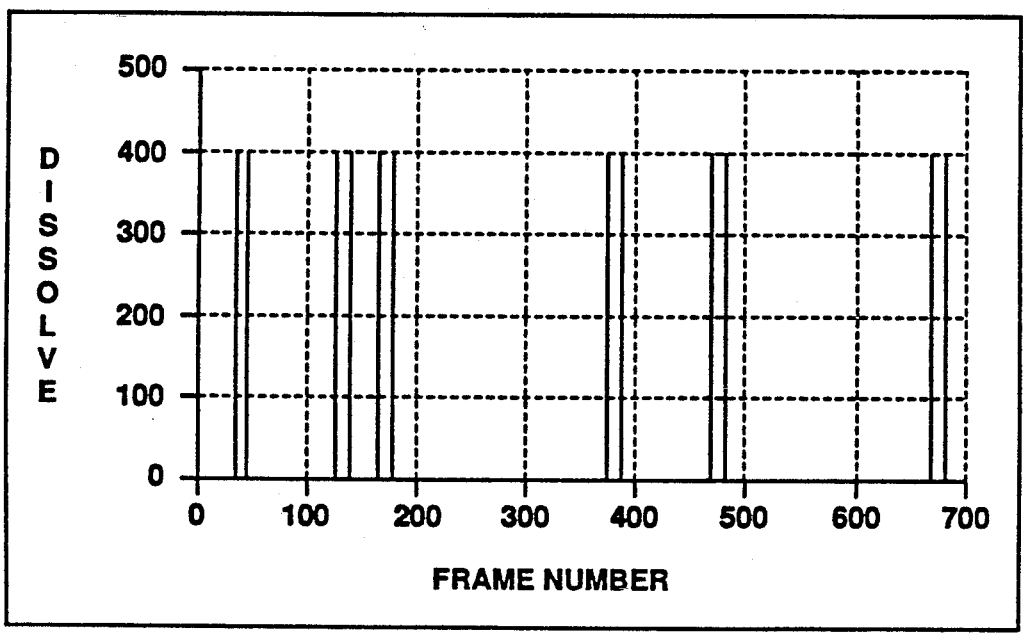
FIG. 5 shows detected dissolve regions for an exemplary sequence of digital motion video frames.

A dissolve detector according to the present invention was implemented in connection with a test video image sequence referred to as the "Comp B" sequence. The variance of each image was first computed to form the variance curve. The second derivative of this curve was approximated by the second order difference $\Psi_f(nT)$ given in Eq. (8). The value of the thresholds T2, T3, and T4, and of L and $k_d$ were empirically chosen and set to be 3, 2, 45, 21 and 3.5, respectively. FIG. 2 shows the variance curve for the "Comp B" sequence. FIG. 3 is a blowup of the "Comp B" sequence variance curve showing the dissolve region between frames 466 and 480. The preprocessed second derivative of the exemplary variance curve is shown in FIG. 4 where the negative spikes around each dissolve region can be seen. During preprocessing of the second-order difference curve, the spikes at frames 86, 552, and 701 were removed as they were due to hard scene changes; the spikes at frames 17,355, and 368 were also removed. In FIG. 5, the detected dissolve region boundaries for the exemplary sequence are shown.

In the preferred embodiment described above, calculating means 100, for calculating a function based on statistical data derived from a frame sequence, began by calculating the second-order difference of the variance curve for a frame sequence to be encoded. In alternate embodiments, the function calculated by the calculating means may be a representation of the first-order difference of the variance curve of a frame sequence, or may simply be a representation of the variance curve corresponding to a frame sequence. Other higher-order differential representations of the variance curve may also be employed. In addition, although the derived statistical data used in the preferred embodiment came directly from a frame sequence being encoded, in alternate embodiments, such derived statistical data could be derived from displacement vectors, difference images, error images or the like which themselves are derived from a frame sequence being encoded. Such statistical data could also be derived from the low frequency or high frequency content of a frame sequence being encoded, or from images derived from such high or low frequency content. Finally, the derived statistical data is not limited to data representative of variance information, but may include standard deviation or other statistical data derived from a frame sequence.

In the preferred embodiment of the present invention, the dissolve region boundary detecting means 130, for detecting from a calculated function whether a dissolve region boundary is present, determines a dissolve region boundary to be present where the calculated function exceeds a predetermined threshold. In alternative embodiments, a dissolve region boundary may be detected where the actual (as opposed to absolute) value of the calculated function exceeds a positive threshold, or where the actual value of the function falls below a negative threshold. Where the function calculated by the calculating means is simply a representation of a variance curve derived from a frame sequence, a dissolve region boundary may be detected by determining where that function is parabolic in shape. Similarly, if a first-order difference representation of a variance curve is used as the calculated function, dissolve region boundaries may be determined to be present where the calculated function is discontinuous.

In the preferred embodiment, if dissolve region boundary detection means 130 determines a pair of consecutive boundaries to exist, further analysis is performed in the region between that pair of detected boundaries before determining whether to flag the region between that pair of detected boundaries as a dissolve region. In particular, in that embodiment the calculated average value between the pair of detected boundaries was required to exceed T2 and the distance between the pair of detected boundaries was required to be less than T3 before a dissolve region was flagged. In alternative embodiments, a dissolve region may be flagged or detected simply by detecting its associated boundaries. In such embodiments, a dissolve region may be detected or flagged solely based on where a calculated function exceeds or falls below a predetermined threshold, where a calculated function is discontinuous, or where a calculated function is parabolic in shape. In further alternative embodiments, the width of a detected or flagged dissolve region may span between and including detected boundary pairs, may span between but excluding such pairs, or may span somewhat beyond such pairs. As noted above, the width may be frame-shifted due to differential or other approximating or processing operations.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for compressing a dissolve region within s sequence of digital motion video frames comprising the steps of:
   (a) selecting a plurality of frames from said sequence for processing;
   (b) calculating a dissolve measure based on statistical data derived from said selected frames;
   (c) detecting dissolve region boundaries within said sequence by determining where the absolute value of said dissolve measure exceeds a first predetermined threshold; and
   (d) compressing at least one of said selected frames in accordance with the result of step (c).

2. The method of claim 1, wherein step (c) further comprises the step of:
   selecting at least one pair of consecutive detected boundaries and for said at least one pair of consecutive detected boundaries
   i. calculating the average value of said dissolve measure between said consecutive detected boundaries; and
   ii. flagging a dissolve region when said average value exceeds a second predetermined threshold.

3. The method of claim 2, wherein a dissolve region is flagged in step (c)(ii) only when the distance between said consecutive detected boundaries is less than a third predetermined threshold.

4. The method of claim 3, wherein the width of said detected dissolve region in step (c)(ii) spans between and including said detected consecutive boundaries.

5. The method of claim 3, wherein the width of said dissolve region in step (c)(ii) is greater than the width spanning between said detected consecutive boundaries.

6. The method of claim 4, wherein dissolve region boundaries are detected in step (c) at spikes where the absolute value of said dissolve measure exceeds said first predetermined threshold.

7. The method of claim 6, wherein step (b) further comprises removing from said dissolve measure all but the first spike in any cluster of spikes.

8. The method of claim 7, wherein step (b) further comprises setting the value of said dissolve measure to zero at each point immediately next to a negative spike.

9. The method of claim 1, wherein said dissolve measure is calculated in step (b) based on the statistical variance of pixel values within each of said selected frames.

10. The method of claim 9, wherein said dissolve measure is the second order difference of the statistical variance of pixel values within each of said selected frames.

11. The method of claim 10, wherein said first predetermined threshold varies in accordance with the local characteristics of said dissolve measure and step (c) further comprises determining said first predetermined threshold for at least one point of said dissolve measure.

12. The method of claim 11, wherein step (c) further comprises the steps of:
   i. calculating a first mean representing the mean of said dissolve measure within a first window adjacent to said at least one point;
   ii. calculating a second mean representing the mean of said dissolve measure within a second window adjacent to said at least one point;
   iii. calculating the difference of the result of step (i) and the result of step (ii); and
   iv. comparing said difference to a fourth predetermined threshold and if said difference exceeds said fourth predetermined threshold then
      determining said first predetermined threshold from the mean and standard deviation of said dissolve measure within a window centered about said at least one point but excluding said at least on point
   otherwise
      determining said first predetermined threshold from the mean and standard deviation of said dissolve measure within the adjacent window corresponding to the smaller of said first and second means.

13. The method of claim 6, wherein step (b) further comprises the steps of:
   i. detecting all spikes in said dissolve measure which are due to hard scene changes; and
   ii. removing from said dissolve measure all spikes detected in step (i).

14. The method of claim 10, wherein said detected boundaries have been frame shifted and step (c) further comprises adjusting said detected boundaries to compensate for said frame shifting.

15. The method of claim 1, wherein said statistical data is derived from motion compensation displacement vectors generated from said selected frames.

16. The method of claim 1, wherein said statistical data is derived from difference images generated from said selected frames.

17. The method of claim 1, wherein said statistical data is derived from motion compensation error images generated from said selected frames.

18. The method of claim 1, wherein said statistical data is derived from the high frequency content of said selected frames.

19. The method of claim 1, wherein said statistical data is derived from the low frequency content of said selected frames.

20. A method for compressing a dissolve region within a sequence of digital motion video frames comprising the steps of:
   (a) selecting a plurality of frames from said sequence for processing;

(b) calculating a dissolve measure based on statistical data derived from said selected frames;

(c) detecting dissolve region boundaries within said sequence by determining where said dissolve measure first decreases then increases in a parabolic fashion; and (d) compressing at least one of said selected frames in accordance with the result of step (c).

21. The method of claim 20, wherein step (c) further comprises the step of:

selecting at least one pair of consecutive detected boundaries and for said at least one pair of consecutive detected boundaries i. determining the distance between said consecutive detected boundaries; and ii. flagging a dissolve region when said distance between said consecutive detected boundaries is less than a predetermined threshold.

22. The method of claim 21, wherein the width of said dissolve region in step (c)(ii) is equal to the width between and including said detected consecutive boundaries.

23. The method of claim 21, wherein the width of said dissolve region in step (c)(ii) is greater than the width spanning between and including said detected consecutive boundaries.

24. The method of claim 20, wherein step (b) further comprises the step of filtering said dissolve measure.

25. The method of claim 20, wherein said dissolve measure is the statistical variance of pixel values with each of said selected frames.

26. The method of claim 20, wherein said statistical data is derived from motion compensation displacement vectors generated from said selected frames.

27. The method of claim 20, wherein said statistical data is derived from difference images generated from said selected frames.

28. The method of claim 20, wherein said statistical data is derived from motion compensation error images generated from said selected frames.

29. The method of claim 20, wherein said statistical data is derived from the high frequency content of said selected frames.

30. The method of claim 20, wherein said statistical data is derived from the low frequency content of said selected frames.

31. An apparatus for compressing a dissolve region within a sequence of digital motion video frames comprising:

(a) means for selecting a plurality of frames from said sequence for processing;

(b) means for calculating a dissolve measure based on statistical data derived from said selected frames;

(c) dissolve region boundary detection means for detecting the presence of dissolve region boundaries within said sequence from said dissolve measure; and (d) means, responsive to said dissolve measure, for compressing at least one of said selected frames.

32. The apparatus of claim 31, wherein said dissolve region boundary detection means detects a dissolve region boundary where said dissolve measure has an absolute value which exceeds a first predetermined threshold.

33. The apparatus of claim 32, wherein said dissolve region boundary detection means further comprises:

(i.) means for selecting at least one pair of consecutive detected boundaries;

(ii.) means for calculating the average value of said dissolve measure between said at least one pair of consecutive detected boundaries; and (iii.) dissolve region flagging means for determining when said average value exceeds a second predetermined threshold.

34. The apparatus of claim 31, wherein said dissolve region boundary detection means detects a dissolve region boundary where said dissolve measure first increases then decreases in a parabolic fashion.

35. The apparatus of claim 34, wherein said dissolve region boundary detection means further comprises:

(i.) means for selecting at least one pair of consecutive detected boundaries;

(ii.) means for calculating eh average value of said dissolve measure between said at least one pair of consecutive detected boundaries; and (iii.) dissolve region flagging means for determining when said average value exceeds a second predetermined threshold.

* * * * *

UNITED STATES PATENT AND TRADEMARK OFFICE
CERTIFICATE OF CORRECTION

PATENT NO. : 5,283,645
DATED : February 1, 1994
INVENTOR(S) : Adnan M. Alattar

It is certified that error appears in the above-indentified patent and that said Letters Patent is hereby corrected as shown below:

Column 3, line 19, "$\sigma g^2(t)$" should read --$\sigma_g^2(t)$--.

Column 3, line 37, "$\sigma h^2(t)$" should read --$\sigma_h^2$--.

Column 4, line 30 "(8a)" should identify the equation, not be part of it.

Column 7, line 26 "s" should read --a--.

Column 10, line 40 "eh" should read --the--.

Signed and Sealed this

Twenty-first Day of November, 1995

Attest:

BRUCE LEHMAN

*Attesting Officer*　　　*Commissioner of Patents and Trademarks*